United States Patent [19]
Nelson

[11] Patent Number: 5,974,347
[45] Date of Patent: Oct. 26, 1999

[54] AUTOMATED LAWN MOWER

[76] Inventor: Russell G. Nelson, 19001 Hale Mountain Rd., Cane Hill, Ark. 72717

[21] Appl. No.: 08/818,304

[22] Filed: Mar. 14, 1997

[51] Int. Cl.[6] .................................. B62D 5/04; B62D 1/28
[52] U.S. Cl. .................................. 701/22; 701/23; 701/25; 701/209; 180/252; 180/169; 180/168; 250/202
[58] Field of Search .................................. 701/23, 22, 24, 701/209; 250/202; 180/252, 169, 168

[56] References Cited

U.S. PATENT DOCUMENTS

| | | | |
|---|---|---|---|
| 4,133,404 | 1/1979 | Griffin | 180/79.1 |
| 4,180,964 | 1/1980 | Pansire | 56/10.2 |
| 4,184,559 | 1/1980 | Rass | 180/131 |
| 4,530,056 | 7/1985 | MacKinnon et al. | 364/424 |
| 4,533,998 | 8/1985 | Falamak | 364/424 |
| 4,694,639 | 9/1987 | Chen et al. | 56/10.2 |
| 4,777,785 | 10/1988 | Rafaels | 56/10.2 |
| 4,887,415 | 12/1989 | Martin | 56/10.2 |
| 4,919,224 | 4/1990 | Shyu et al. | 180/168 |
| 4,964,265 | 10/1990 | Young | 56/10.8 |
| 5,155,684 | 10/1992 | Burke et al. | 364/424.02 |
| 5,163,273 | 11/1992 | Wojtkowski et al. | 56/11.9 |
| 5,204,814 | 4/1993 | Noonan et al. | 364/424.02 |
| 5,297,049 | 3/1994 | Gurum et al. | 701/22 |
| 5,299,130 | 3/1994 | Ono | 701/24 |
| 5,572,856 | 11/1996 | Ku | 56/10.2 A |
| 5,852,791 | 12/1998 | Sato et al. | 701/209 |

OTHER PUBLICATIONS

Machine Design, Mar. 23, 1989, p. 18, "Self–steering mower may become commerical reality".
The Futurist, Jan.–Feb. 1989, p. 39, "Robo Mower".
Machine Design, Jul. 24, 1986, p. 8, "First Practical domestic Robot May be a Lawnmower".

*Primary Examiner*—William A. Cuchlinski, Jr.
*Assistant Examiner*—Olga Hernandez

[57] ABSTRACT

An improved automated, self propelled lawn mower (14) utilizing a rotating directional loop antenna (36) that determines its position within the cutting area by measuring the angle between transmitters(20A, B, & C) placed in a known configuration beyond the cutting area, and by calculating the solution of simultaneous circle equations (96 & 98) defined by that configuration. Orientation is determined by comparing present and previous positions. Stored path information is compared with the calculated position to determine steering signals which direct the mower to move directly toward the next point in the desired path. When the mower reaches that point the next coordinates are retrieved from memory and the process is repeated similarly for all successive points in the path. The simplicity of programming the path makes this automated lawn mower very versatile and flexible.

10 Claims, 16 Drawing Sheets

DIRECTIONAL LOOP ANTENNA

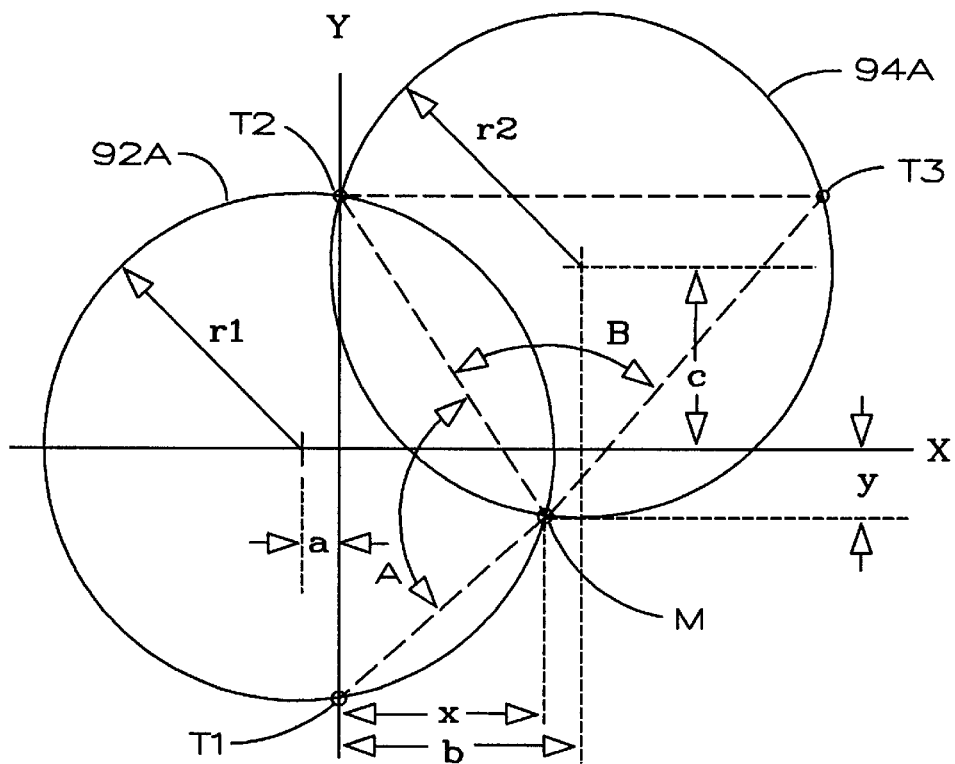
92B: $(x+a)^2 + y^2 = r1^2$
94B: $(x-b)^2 + (y-c)^2 = r2^2$
96: $x = \sqrt{r1^2 - a^2 - H^2 + \left(\dfrac{a-HK}{1+K^2}\right)^2} - \left(\dfrac{a-HK}{1+K^2}\right)$
$H = \dfrac{r1^2 - r2^2 - a^2 + b^2 + c^2}{2c} \qquad K = \dfrac{a+b}{c}$
98: $y = [r1^2 - r2^2 - a^2 + b^2 + c^2 - 2x(a+b)] / 2c$
F I G. 5A 100: $r1 = \sin(A)/2d$ 102: $a = r1 - \dfrac{d/2}{\tan(A/2)}$ NOTES:
given angle B, d, & e
calculate radius r2
and offsets b & c $h' = (e/2)/\sin(B/2)$ $f = h'\cos(B/2) - r2$ 104: $r2 = 1/2 \left(\dfrac{\sin(B)}{e}\right)$ 106: $b = e/2$ 108: $c = d/2 - f$

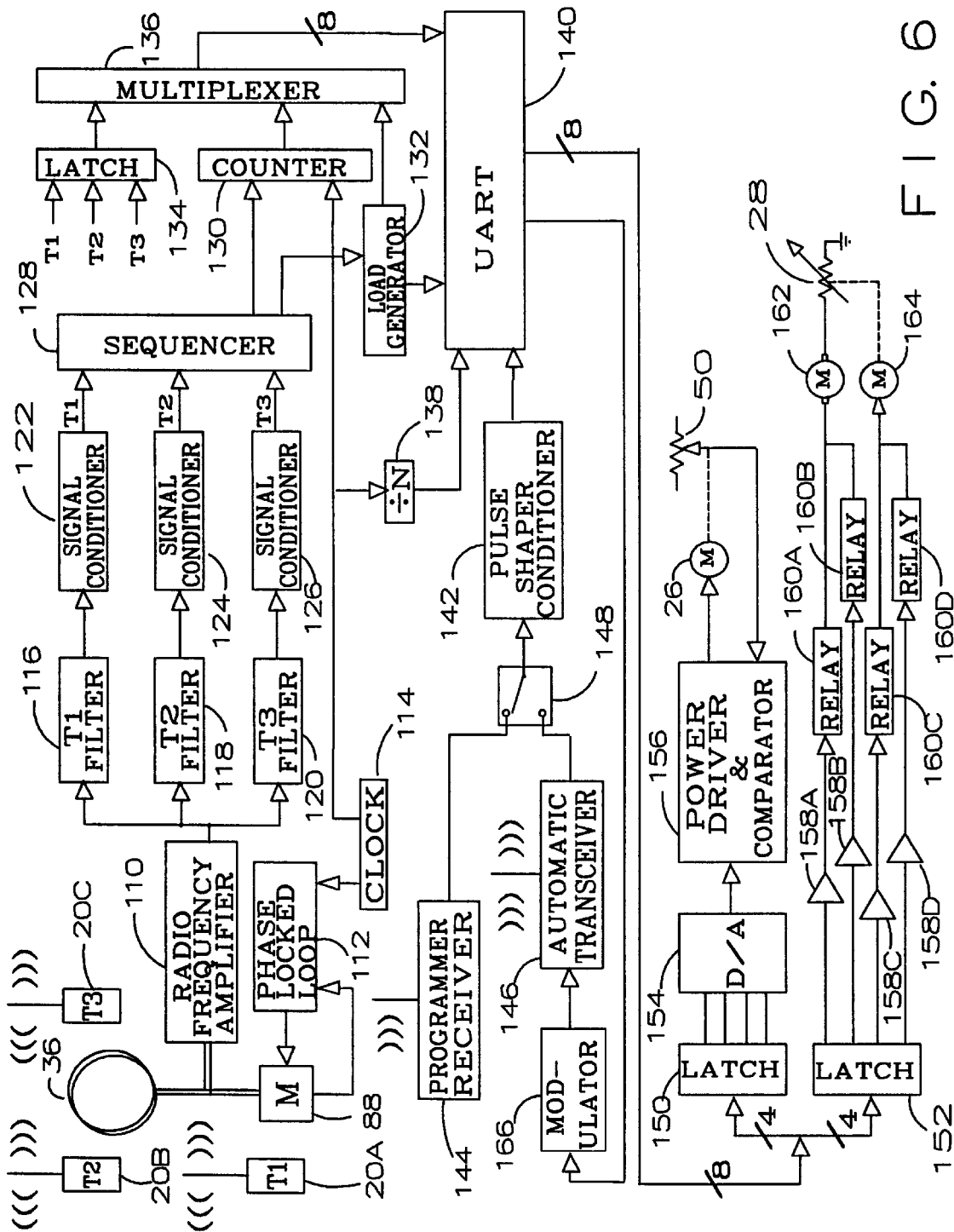

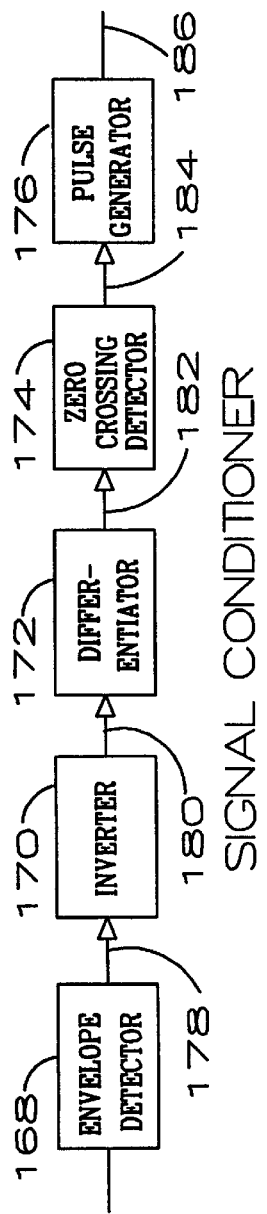
FIG. 7 SIGNAL CONDITIONER
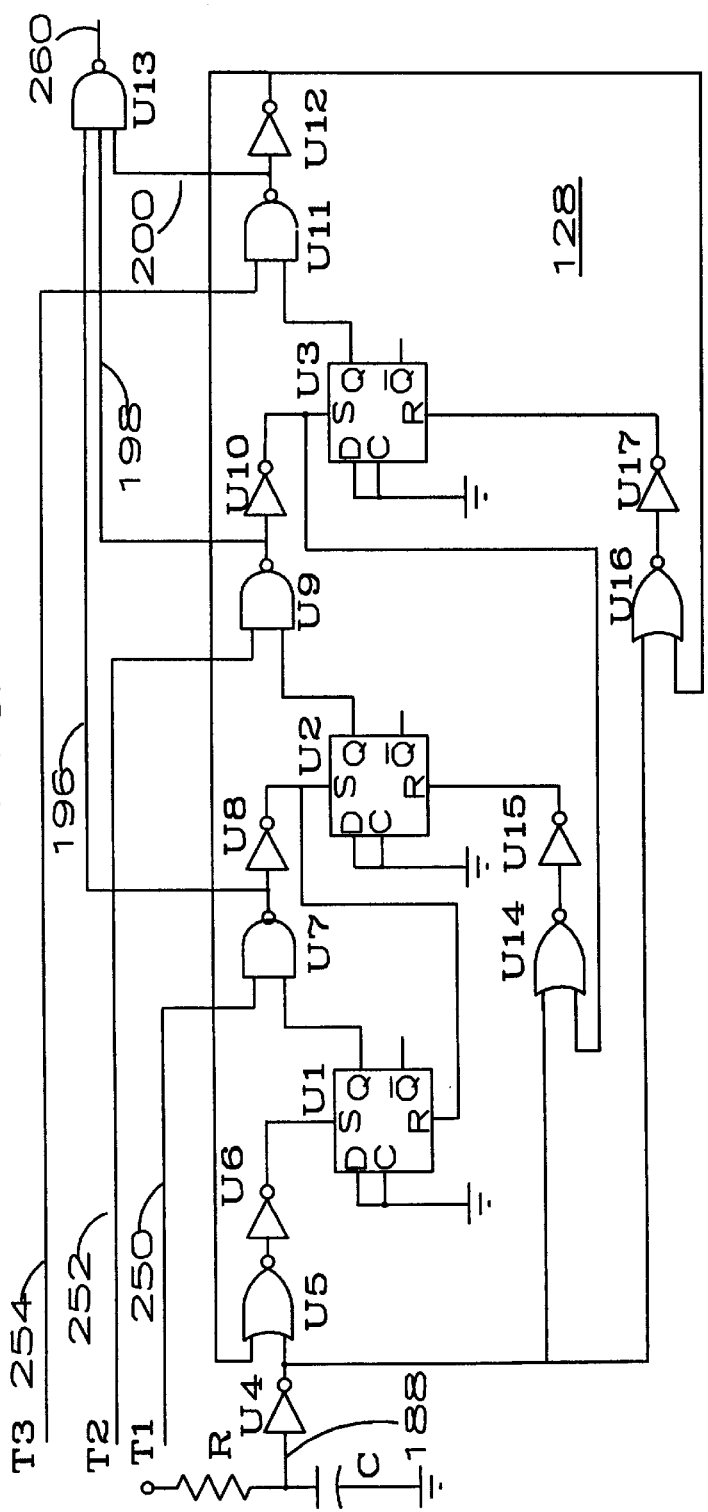
FIG. 8 SEQUENCER

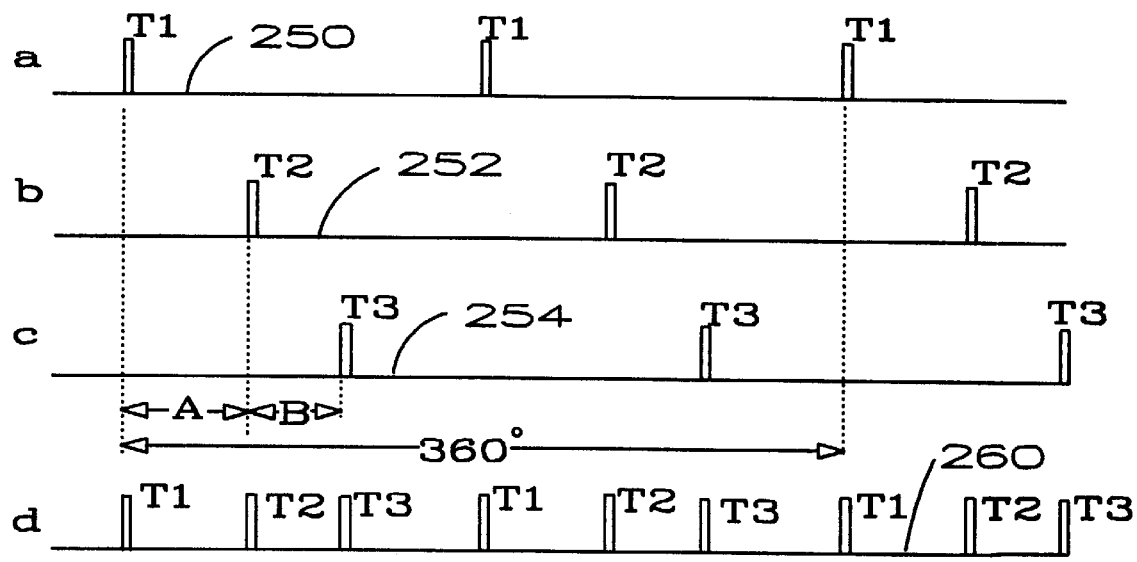
F I G. 10A
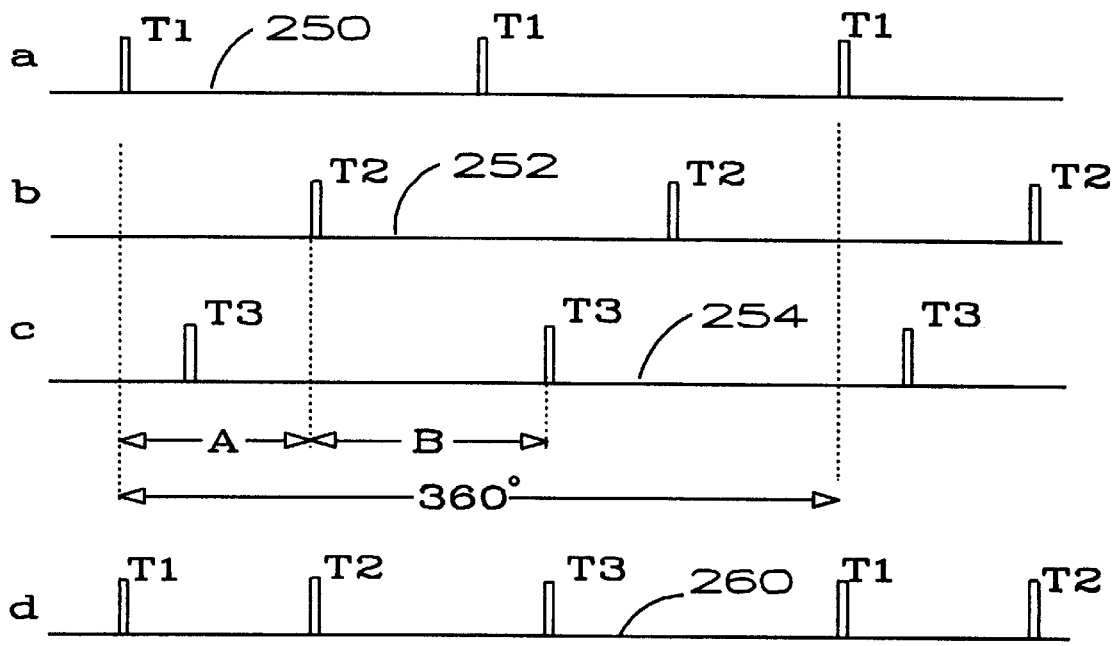
F I G. 10B

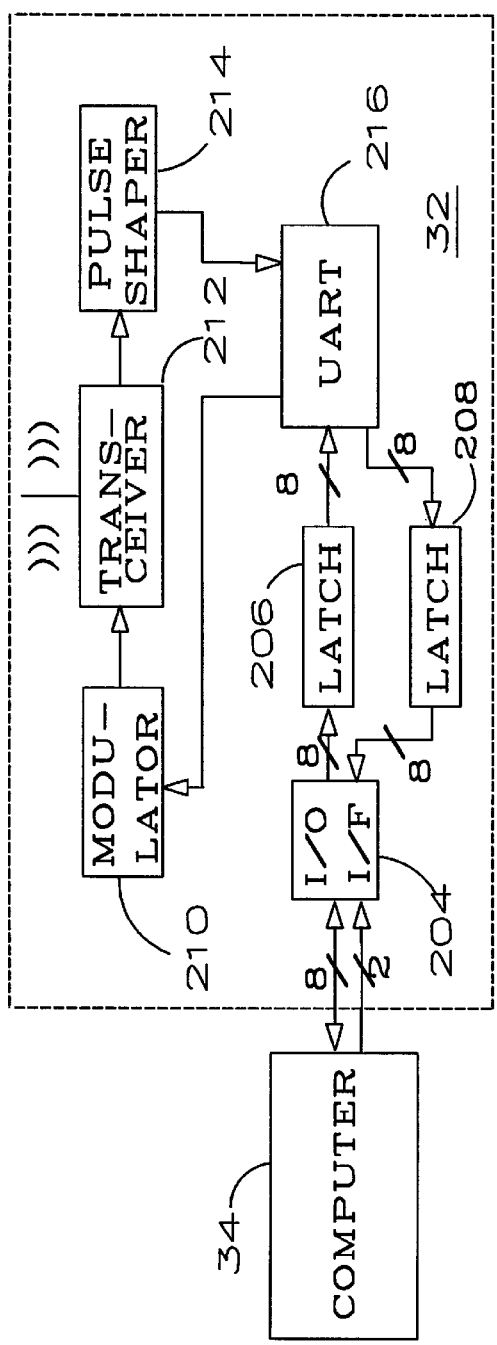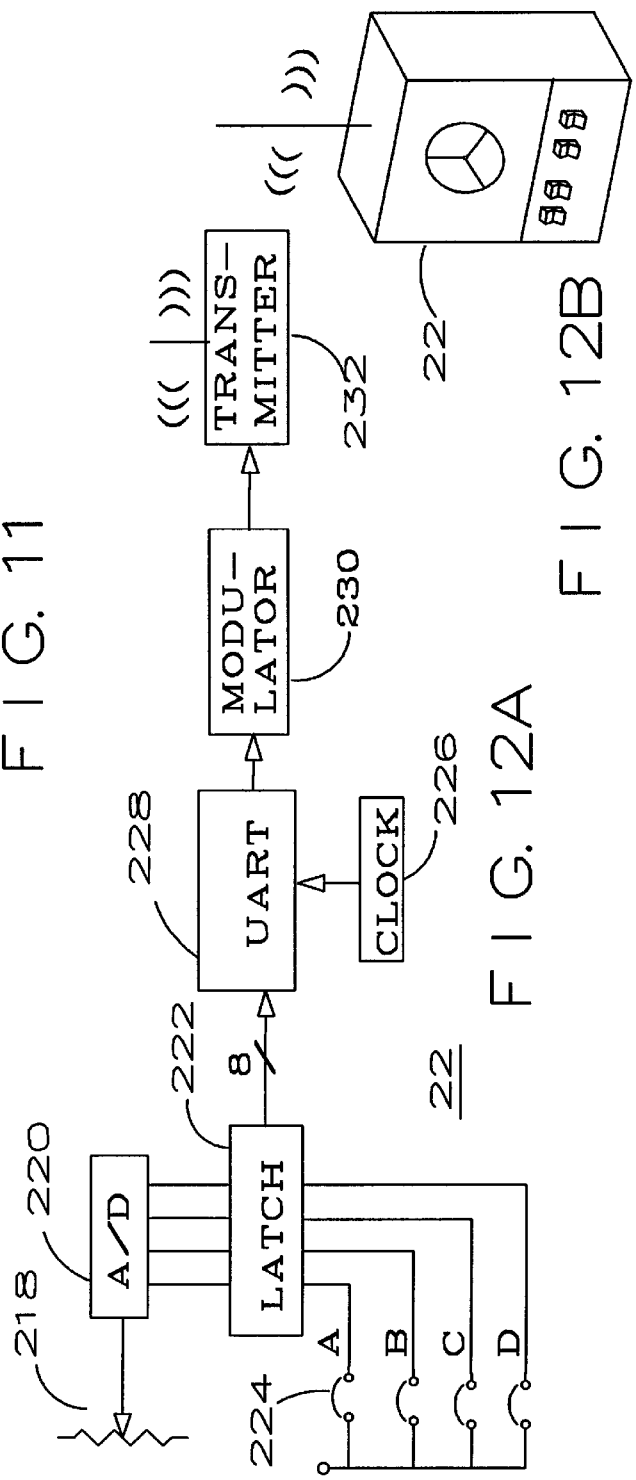

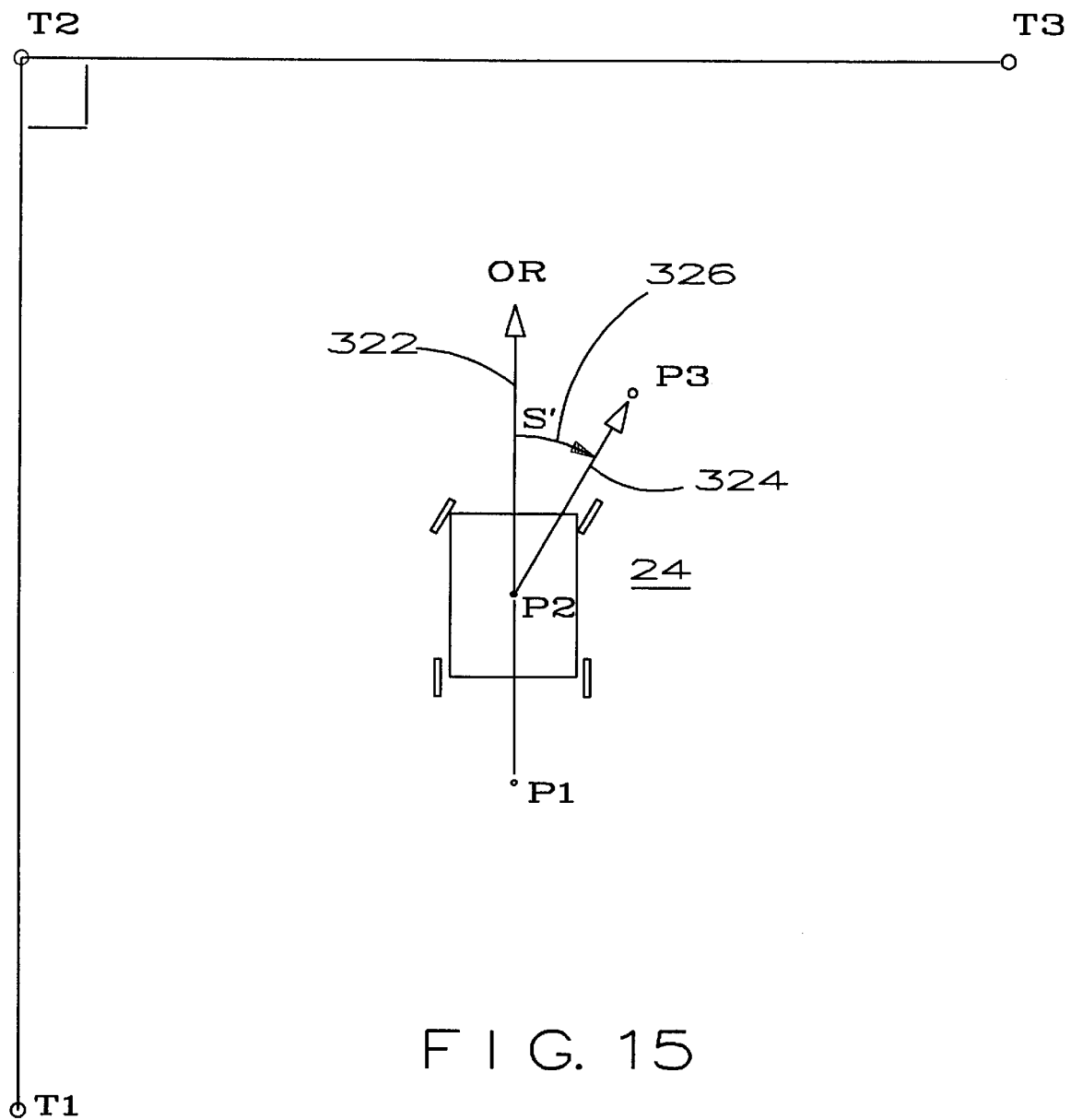
F I G. 15

AUTOMATED LAWN MOWER

BACKGROUND—FIELD OF INVENTION

This invention relates to automatic location and control of a vehicle, specifically to a self-propelled mower capable of mowing a lawn by itself after being programmed.

BACKGROUND—DESCRIPTION OF PRIOR ART

Automatic guidance of self propelled lawn mowers and navigation systems for robotic lawn mowers capable of being programmed and mowing a lawn by itself are known in the art. The problem is to determine the mower's location in reference to known points or the grass to be cut. U.S. Pat. No. 5,204,814, issued to Noonan et al. (1993) discloses a method for guiding an autonomous self propelled lawn mower that references its position within a cutting area using electronically stored path and terrain information as a primary navigation system. It employs underground metallic guides and underground metallic references for use as position reference points. Such a system teaches away from systems which do not require recalibrating the unit's position for correcting misalignment of the unit. It is disadvantageous because of the tedium and expense of burying metallic guides and references underground. Buried guides also make it inflexible to make a change in the guide path.

Robotic lawn mowers of the prior art, such as that disclosed by Rafaels in U.S. Pat. No. 4,777,785, (1988) utilize sensors to identify a location of a traversing cut-uncut vegetation border. This requires a large number of sensors, and with irregularities in the height of grass because of dead areas, the mower could lose detection of the grass border.

U.S. Pat. No. 4,133,404 to Griffin ( 1979) requires an optical tracking system and complex mechanical construction. It also utilizes the transition of cut/uncut grass. It requires an initial cut border about the periphery of the/lawn and any obstacles within the area.

U.S. Pat. No. 4,887,415 to Martin (1989) and U.S. Pat. No. 4,184,559 to Rass (1980) involve grass touch detection switches or mechanical sensors which suffer from the same unreliability as other systems using detection of a grass border.

U.S. Pat. No. 4,694,639 to Chen et al. (1987), discloses a mower with a paper-tape memory unit with a lead wheel to guide the movement of the mower. This system is unsatisfactory because of its inability to correct steering errors due to wheel slippage and rough terrain.

Other known prior art devices describe navigation systems where vehicles follow a wire or guide path. U.S. Pat. No. 5,163,273 to Wojtkowski et al. (1992), U.S. Pat. No. 4,530,056 to MacKinnon et al. (1985), and U.S. Pat. No. 4,180,964 to Pansire (1990) describe such systems. Another guide wire device is described in U.S. Pat. No. 4,919,224 to Shyu et al. (1990). It teaches away from directional detecting devices for detecting relative direction and distance in reference to points. The closed loop devices mentioned do not include use of a directional loop antenna. It uses a guide-wire device which is inconvenient and limited. These systems all suffer from the same lack of flexibility to change a path.

U.S. Pat. No. 4,533,998 to Falamak (1985) discloses a polar coordinated platform in which an angle selector produces a steering angle signal combined with a compass signal in an angle comparator to produce a steering signal. It does not relate to the x-y coordinate determination of the location of the unit by a rotating directional loop antenna.

U.S. Pat. No. 5,155,684 to Burke et al. (1992) uses a video camera to observe overhead features such as lights. This is a complex and costly system and was meant primarily for industrial or commercial buildings having pre-existing overhead lights.

The remotely controlled lawn mowers disclosed in U.S. Pat. No. 5,572,856 to Ku (1996) and U.S. Pat. No. 4,964,265 to Young (1990) do not relate to automatic control of the unit.

Other publications include Machine Design, Mar. 23, 1989, pg 18, "Self Steering Mower May become Commercial Reality", and The Futurist, Jan-Feb. 1989, pg 39, "Robo Mower". These articles describe a mower which senses an uncut border. Machine Design, Jul. 24, 1986, pg 8, "First Practical domestic Robot May be a Lawnmower", discusses safety. It does not describe detailed solutions of navigation problems.

While the inventors of the above mowing devices have made admirable attempts to solve the problem, the prior art methods have failed to provide a satisfactory method of location determination required of such machines. None of the above mentioned devices utilize a navigation system to determine the unit's x-y coordinate position independently of markers, wires, or cut/uncut borders. There is a continuing need for improvements to such automated lawn mowers and in this respect, the present invention addresses that need.

OBJECTS AND ADVANTAGES

Accordingly, several objects and advantages of the present invention are:

(a) to provide an automated lawn mower which utilizes a rotating directional loop antenna to determine the angle between three continuous wave transmitters placed in a right angle formation and to calculate its precise location from the solution of simultaneous circle equations;

(b) to provide an automated lawn mower that is versatile in programming to follow a variety of different paths and perform mowing a lawn by itself;

(c) to provide an automated lawn mower which follows a programmed path of data points without the use of calibration markers, lights, wires, or buried conductors;

(d) to provide an automated lawn mower that accurately determines its location and orientation without the use of geomagnetic sensors.

(e) to provide an automated lawn mower that reliably moves to successive points of the desired path without depending on cut-uncut grass borders.

(f) to provide an automated lawn mower that is versatile in programming such that it can be maneuvered to follow any physically possible path including crossing over itself and reversal of direction.

Further objects and advantages are to provide an automated lawn mower which is safe, accurate, reliable, and will automatically shut off if it encounters an object in its path. Clearly, there is a need for a navigation system that is independent of wires, buried lines, cut borders, lights, or calibration points. The system must be capable of determining the unit's precise location and orientation within a desired area. It must also determine the action necessary to move it in the desired direction to conform to a desired path. Still further objects and advantages will become apparent from the ensuing description and drawings.

DRAWING FIGURES

In the drawings, closely related figures have the same number but different alphabetic suffixes.

FIG. 5A shows a diagram of two circle equations together showing the intersection which provides the x-y coordinates defining the location of the automated lawn mower.

FIG. 6 shows a functional block diagram of that part of the system located on the automated lawn mower along with three continuous wave transmitters.

FIG. 7 shows the functional blocks associated with signal detection and pulse generation.

FIG. 8 is a schematic diagram of the sequencer.

FIGS. 10A & B are charts of pulses produced from the transmitter signals showing the measured angles A and B between the transmitters.

FIG. 11 shows a functional block diagram of that part of the system located at the remote computer end.

FIGS. 12A & B show the functional block diagram and perspective view, respectively, of the hand-held manual control programming device.

Figure 13:
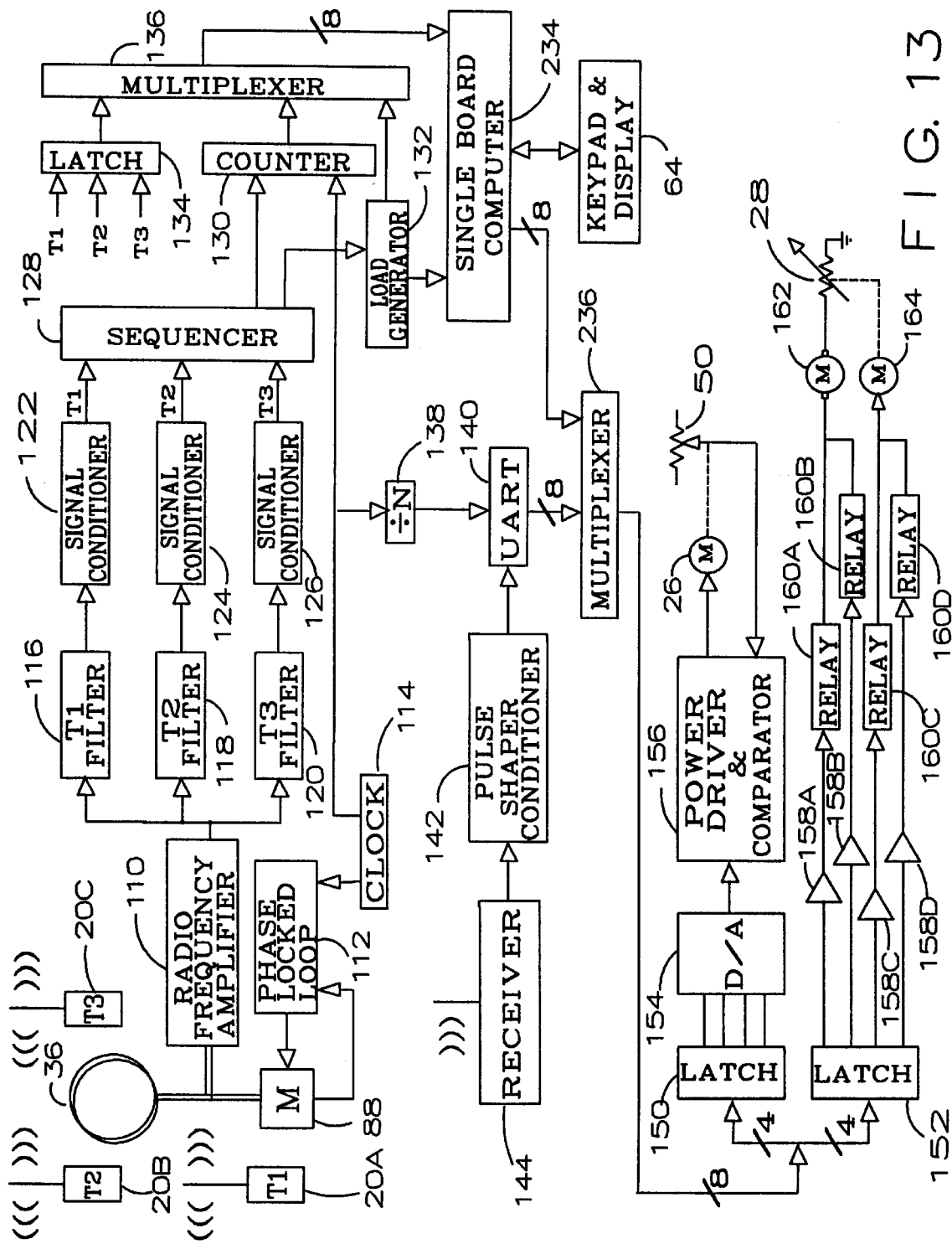

FIG. 13 shows another embodiment of the invention whereby a single board computer on board the automated lawn mower replaces the remotely located computer.

Figure 14A:
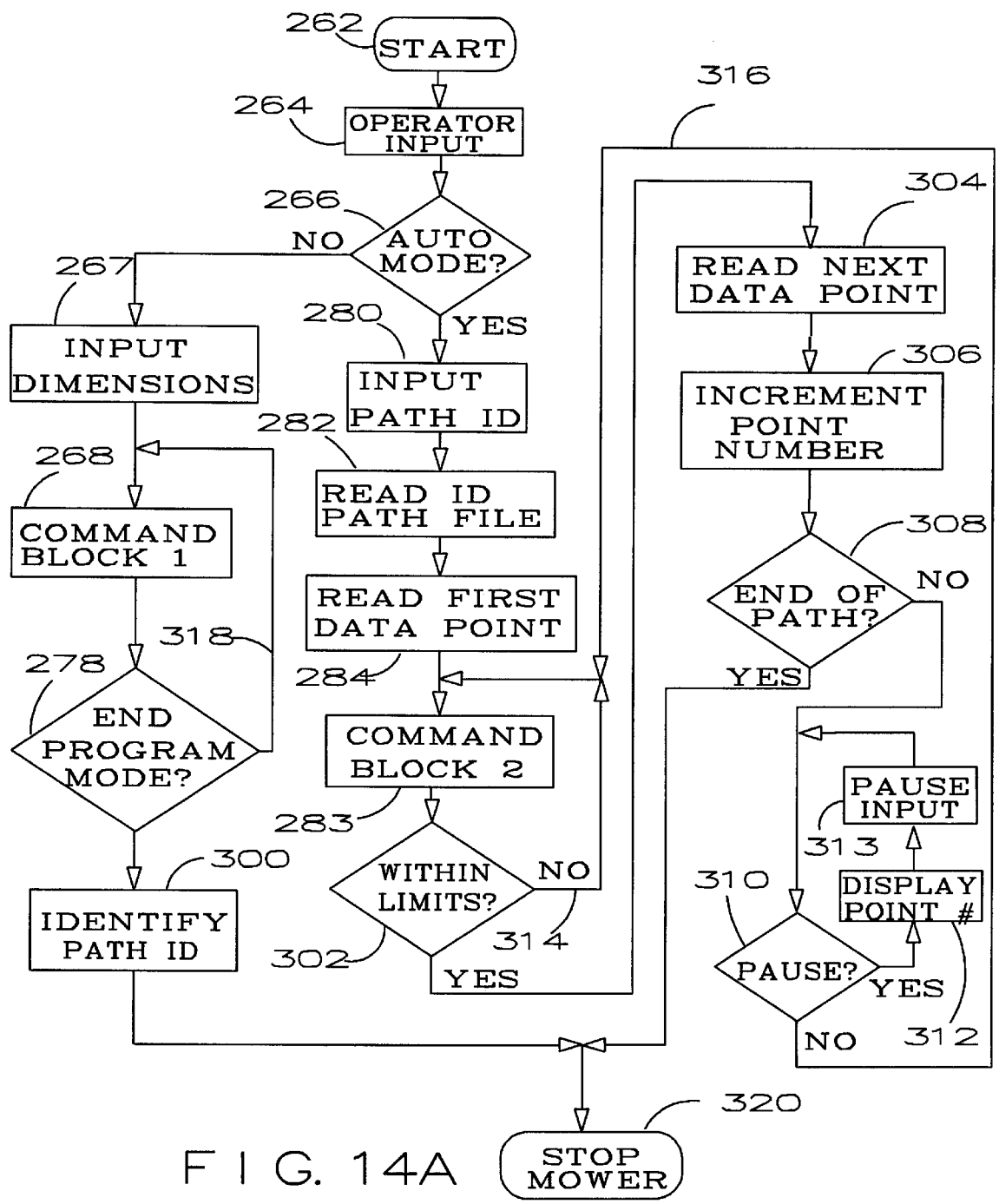

FIGS. 14A, B, & C are process flow diagrams of the central processor unit.

FIG. 15 is a sketch of the mower showing the relationship of the orientation vector to the pointing vector of the next point in the path.

Figure 16:
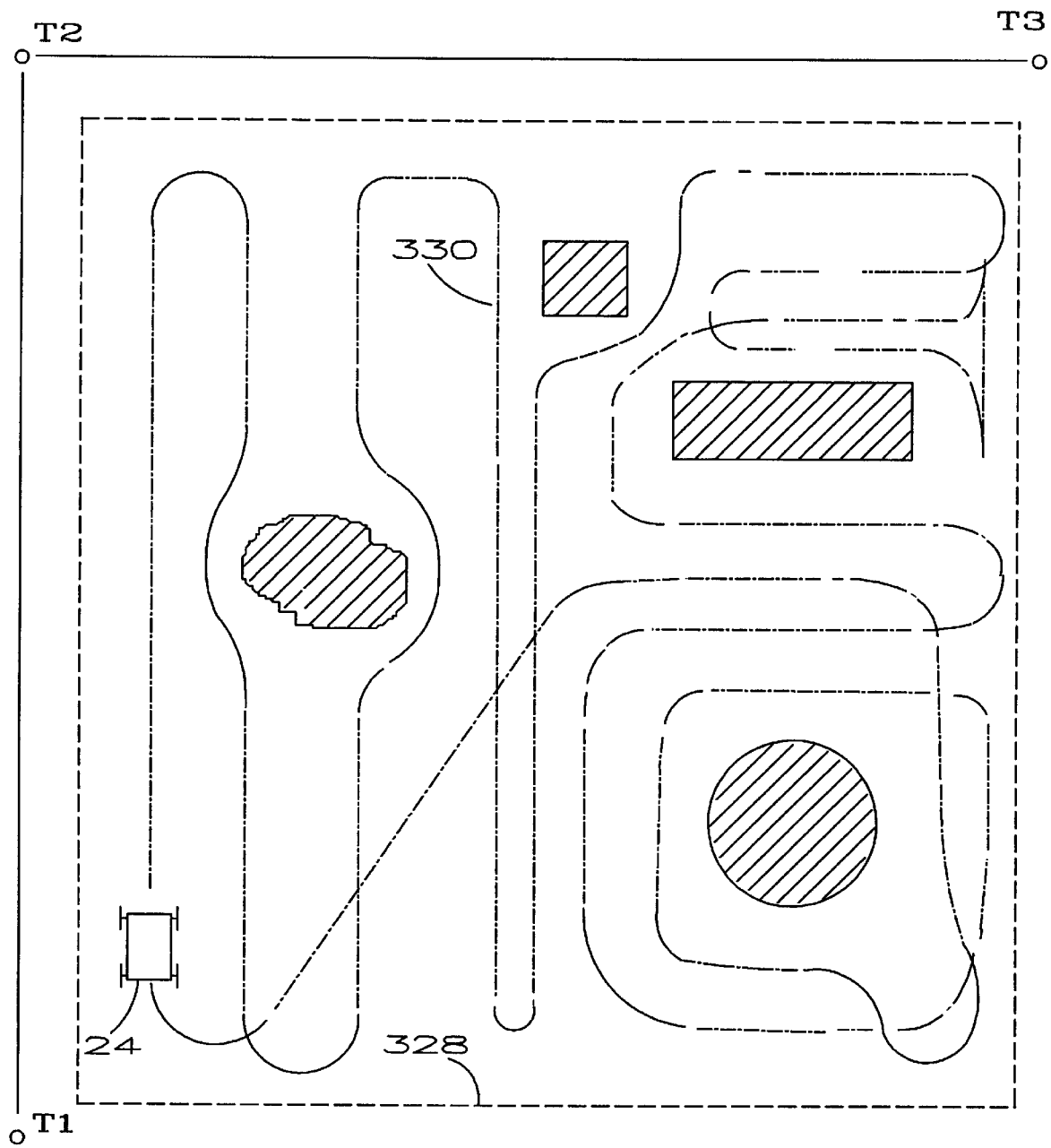

FIG. 16 shows a guide path stored in memory as x-y coordinates, defining the cutting route that the automated lawn mower will follow within an area defined by the locations of transmitters T1, T2, and T3.

REFERENCE NUMERALS IN DRAWINGS

| | |
|---|---|
| 20A,B, & C - continuous wave transmitters | 22 hand-held programmer/transmitter |
| 24 automated mower | 26 steering motor |
| 28 rheostat | 30 protective cover |
| 32 transceiver interface | 34 computer |
| 36 directional loop antenna | 37 coil form |
| 38 housing | 40A & B data antennas |
| 42 engine | 44 battery |
| 46A & B steering wheels | 48A & B drive wheels |
| 50 potentiometer | 51 worm gear |
| 52 front bumper | 53 connecting arm |
| 54 rear bumper | 55 cross arm |
| 56 cutting blade | 57 short arm |
| 58 differential | 59A & B pivot arm |
| 62 support frame | 64 keypad and display |
| 66A & B slip rings | 68A & B contact brushes |
| 70 support tube | 72 wheel |

-continued

| | |
|---|---|
| 74 pulley | 76 shaft |
| 78 belt | 80 motor pulley |
| 82 light source | 84 light sensor |
| 86 notched disk | 88 direct current electric motor |
| 90 motor shaft | 92A circle # one |
| 92B equation of circle # one | 94A circle # two |
| 94B equation of circle # two | 96 solution for x-coordinate |
| 98 solution for y-coordinate | 100 equation for radius r1 |
| 102 equation for offset a | 104 equation for radius r2 |
| 106 equation for offset b | 108 equation for offset c |
| 110 radio frequency amplifier | 112 phase locked loop |
| 114 clock generator | 116 T1 filter |
| 118 T2 filter | 120 T3 filter |
| 122 T1 signal conditioner | 124 T2 signal conditioner |
| 126 T3 signal conditioner | 128 sequencer |
| 130 counter | 132 load pulse generator |
| 134 latch | 136 multiplexer |
| 138 divide-by-N circuit | 140 UART |
| 142 pulse shaper/conditioner | 144 manual control receiver |
| 146 computer transceiver | 148 selector switch |
| 150 steering latch | 152 drive latch |
| 154 D/A converter | 156 power driver and comparator |
| 158A, B, C, & D driver | 160A, B, C, & D relays |
| 162 drive motor | 164 speed control motor |
| 166 modulator | 168 envelope detector |
| 170 inverter | 172 differentiator |
| 174 zero crossing detector | 176 pulse generator |
| 178 envelope waveform | 180 inverted envelope |
| 182 differentiated envelope | 184 zero crossing square wave |
| 186 indentifier pulse | 188 power-on reset |
| 196 sequencer signal 1 | 198 sequencer signal 2 |
| 200 sequencer signal 3 | 204 I/O interface |
| 206 transmit launch | 208 receive latch |
| 210 modulator | 212 transceiver |
| 214 pulse shaper | 216 UART |
| 218 potentiometer | 220 A/D converter |
| 222 latch | 224A, B, C, & D switch |
| 226 clock generator | 228 UART |
| 230 modulator | 232 transmitter |
| 234 single board computer | 236 multiplexer |
| 238 signal strength antenna pattern | 250 T1 position pulse train |
| 252 T2 position pulse train | 254 T3 position pulse train |
| 260 resultant sequencer output | 262 start / initialize parameters |
| 264 operator data input. | 266 automatic/program decision |
| 267 input dimensions | 268 command block 1 |
| 269 convert count to angle | 270 receive lawn mower data |
| 272 x-y coordinate calculation | 274 store x-y coordinates to memory |
| 276 operator input | 278 end program mode decision |
| 280 input path identification | 282 read identified file into memory |
| 283 command block 2 | 284 read first stored data point |
| 286 receive data from mower | 288 convert count to angle |
| 290 calculate x-y coordinates | 292 calculate orientation |
| 294 generate command signals | 296 output commands |
| 298 calculate proximity limits | 300 identify path id |
| 302 within-limits decision | 304 read next stored data point |
| 306 increment point number | 308 end of path decision |
| 310 pause decision | 312 display point number |
| 313 pause input | 314 loop if not within limits |
| 316 loop if not at path end | 318 loop program mode |
| 320 stop program execution | 322 orientation vector OR |
| 324 steering vector | 326 steering angle S' |
| 328 cutting area | 330 example path |
| 332 drive motor pulley | 334 drive belt |
| 336 differential pulley | |

SUMMARY

In accordance with the present invention an automated lawn mower comprises a means of determining its location by calculating the solution of simultaneous circle equations defined by the angles and distances between continuous wave transmitters. The mower is operative to self navigate along a prescribed path in accordance with stored coordinate information compared with its determined location.

DESCRIPTION—FIGS. 1 TO 16

Figure 1:
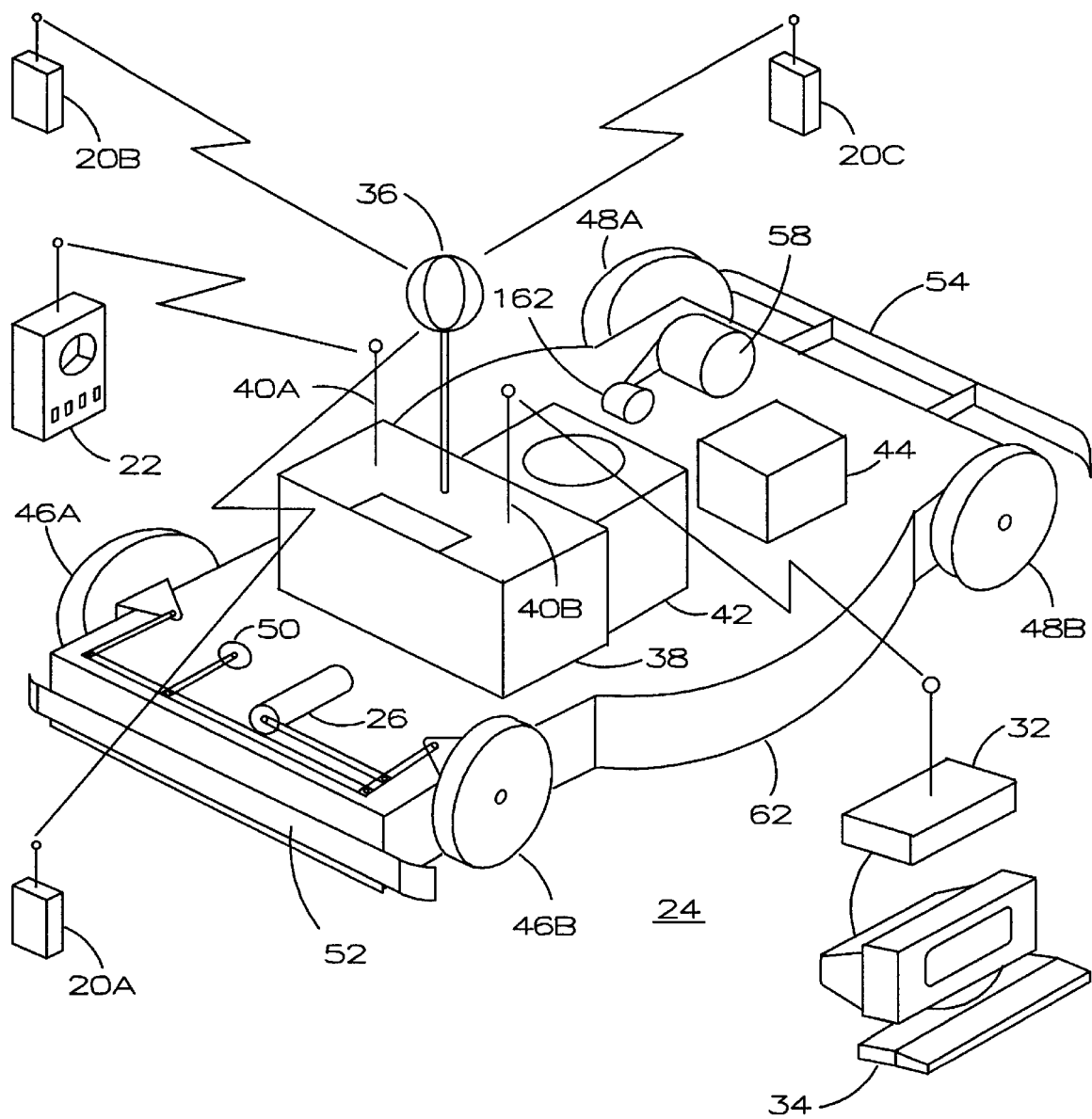
FIG. 1 shows a perspective view of the automated lawn mower system.

A typical embodiment of the present invention is illustrated in the perspective view of FIG. 1. An automated lawn mower 24 of the present invention may include a commercially available four-wheel rotary lawn mower support frame 62 and an engine 42. The operation of the engine is independent of the automated functions of the present invention and thus it is not a consideration. A whip antenna 40A receives data from a hand-held programmer transmitter 22. Another whip antenna 40B communicates with a central processor or computer 34 via a transceiver interface 32. A directional loop antenna 36 receives radio frequency signals from continuous wave transmitters 20A, B, and C. These antennas are supported by a housing 38. A battery 44 provides power to a drive motor 162 and all electronic subsystems of the mower. A safety bumper 52 located in front and a safety bumper 54 in the rear provides for automatic shut down of the mower if it runs into an object that may have been placed in the path of the mower.

Figure 2:
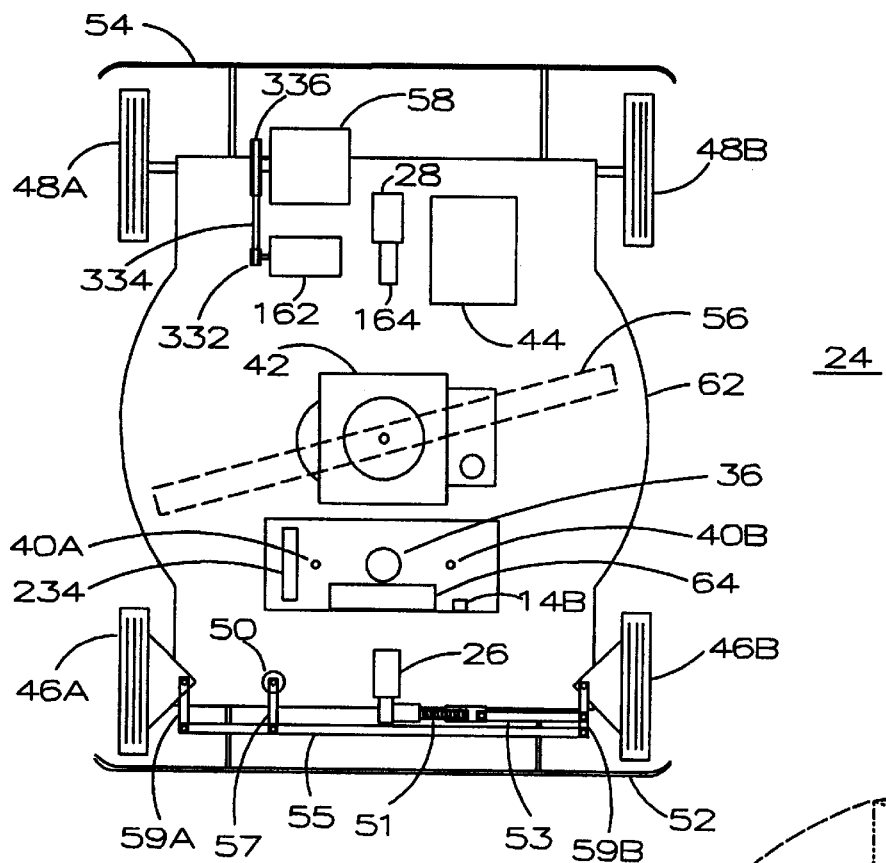
FIG. 2 shows a top view of the automated lawn mower.

FIG. 2 is a top view of automated lawn mower 24 showing the locations of whip antennas 40A and 40B. Directional loop antenna 36 is located between the whip antennas. A selector switch 148 and a keypad/display 64 are mounted for convenient access near the whip antennas. A steering motor 26 is located in the middle front behind safety bumper 52. The steering motor is connected by a worm gear 51 to a connecting arm 53. The other end of the connecting arm is attached to a pivot arm 59B. The pivot arm connects to one end of a cross arm 55. The other end of the cross arm is connected to a pivot arm 59A. The pivot arms connect to steering wheels 46A and B. A short arm 57 attached to a point on the cross arm, pivots on the opposite end to turn a potentiometer 50 to sense the position of the steering wheels. Support frame 62 provides support for engine 42 which turns a cutting blade 56. Drive motor 162 contains a drive motor pulley 332. Pulley 332 is coupled by a drive belt 334 to a differential pulley 336. Pulley 336 is connected to a differential 58 which is connected to rear drive wheels 48A and B by an axle not shown.

Figure 3:
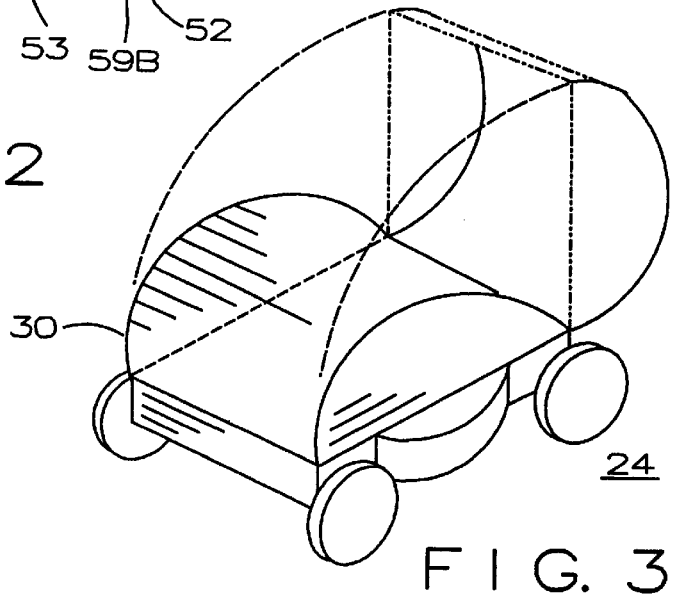
FIG. 3 shows a perspective view of the automated lawn mower with a protective cover.

FIG. 3 is a perspective view of the mower with a hinged protective cover 30.

Figure 4:
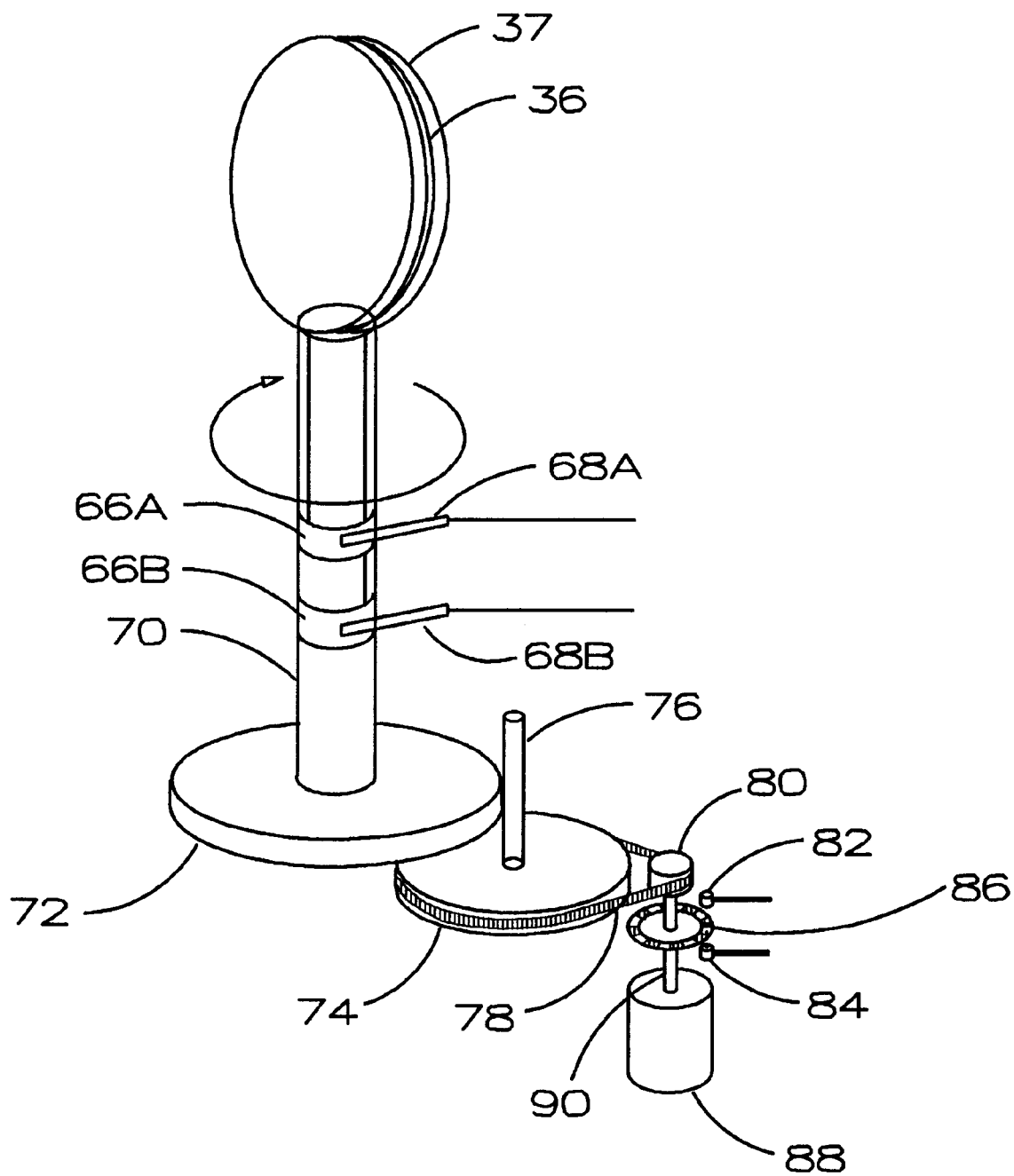
FIG. 4 shows a perspective view of the rotating directional loop antenna.

FIG. 4 is a perspective view of directional loop antenna 36. The antenna is a coil of several turns of wire wound on a form 37. The form is a plastic cylinder attached by glue to a plastic support tube 70. Leads from the coil pass down the inside of the support tube to two slip rings 66A and 66B. A pair of contact brushes 68A and 68B connect the slip rings to leads which carry the radio frequency signal to a radio frequency amplifier 110 in FIG. 6. The support tube is attached to a wheel 72. Wheel 72 is driven by friction contact on its circumference by a shaft 76. Shaft 76 is directly connected to a pulley 74. Pulley 74 is connected to a pulley 80 by a drive belt 78. Pulley 80 is connected to a motor shaft 90 of a direct current electric motor 88. A notched disk 86 is centered on shaft 90 to chop a light beam produced by a light source 82 and a light sensor 84.

FIG. 5A shows an example x-y coordinate system defined by the locations of continuous wave transmitters 20A, 20B, and 20C. These transmitters are shown as points T1, T2 and T3, respectively, in a right angle configuration. The location of mower 24 of FIG. 1 is depicted as M in FIG. 5A. Angle A formed by T1, T2 and M defines a locus of points which is a circle 92A with an offset a on the x-abscissa. An equation 92B then describes circle 92A. Similarly Angle B formed by T2, T3 and M defines a locus of points which is a circle 94A with an offset b in the x-abscissa, and an offset c in the y-ordinate. An equation 94B then describes circle 94A. The solution of the two simultaneous circle equations provides the value x in an equation 96 and the value y in an equation 98.

Figure 5B:
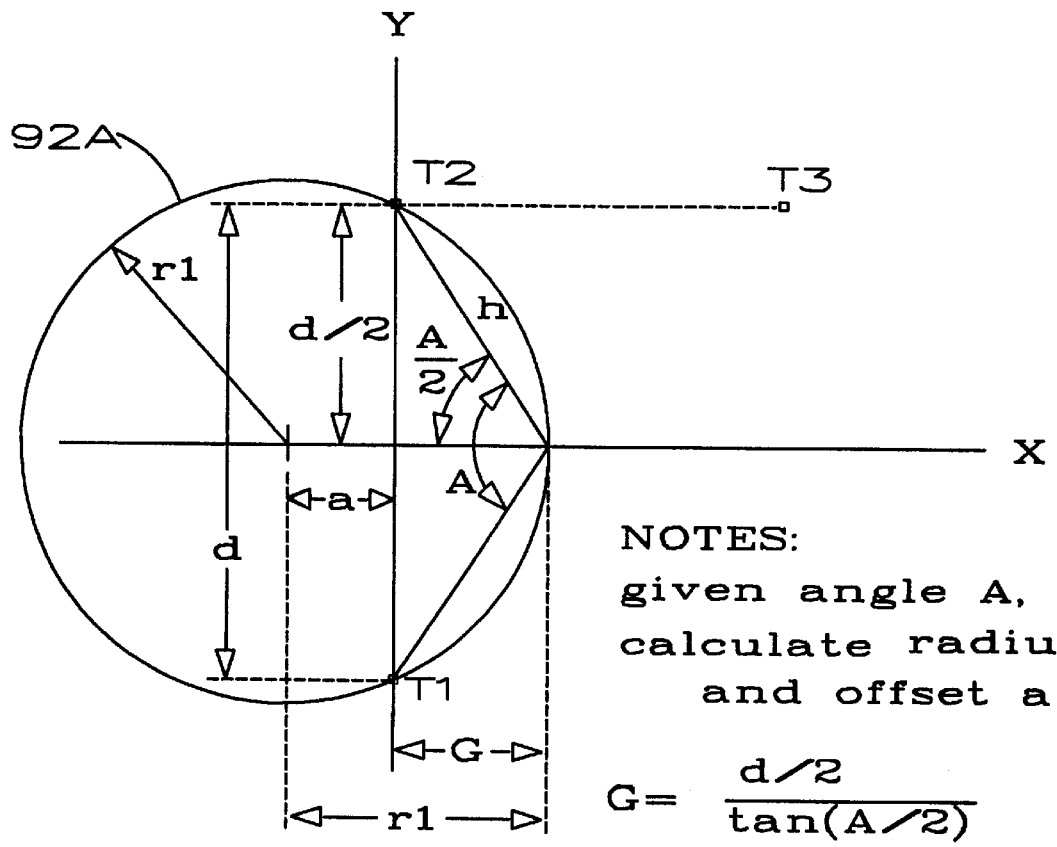
FIG. 5B shows a diagram of one circle defined by the angle A and the chord between transmitters T1 and T2, with the offset a and radius r1.

FIG. 5B shows circle 92A with its radius r1, and its offset a. An equation 100 calculates radius r1 and an equation 102 calculates offset a from the value of angle A and distance d. Angle A is the angle measured by the directional loop antenna between transmitters T1 and T2. Distance d is the distance between transmitters T1 and T2.

Figure 5C:
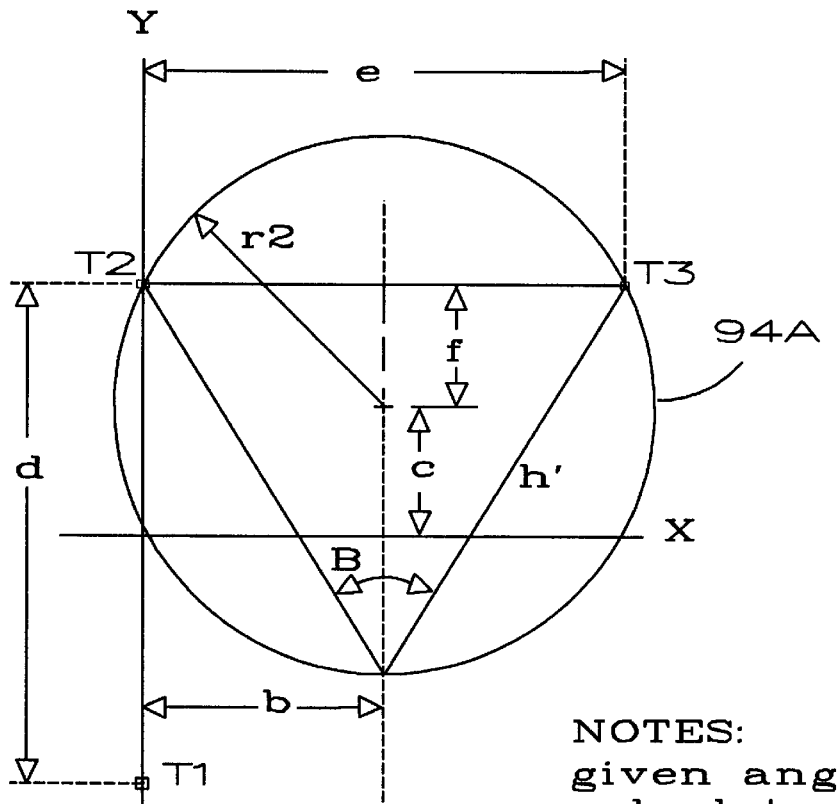
FIG. 5C shows a diagram of another circle defined by the angle B and the chord between transmitters T2 and T3, with the offsets b, c, and radius r2.

FIG. 5C shows circle 94A with its radius r2 and offsets b, and c. An equation 104 calculates radius r2. Equations 106 and 108 calculate offsets b and c, respectively, from angle B and distances d and e. Angle B is the angle measured by the directional loop antenna between transmitters T2 and T3. Distance d is the distance between transmitters T1 and T2. Distance e is the distance between transmitters T2 and T3.

FIG. 6 is a functional block diagram illustrating the system operation in the present invention. The three continuous wave transmitters send a constant signal to directional loop antenna 36. The loop antenna is rotated at a constant speed by direct current motor 88. The speed of the motor is controlled by a phase locked loop 112. The phase locked loop receives input from light sensor 84. A clock 114 provides a reference frequency for the phase locked loop and a counter 130. The frequency of the clock input to counter 130 can be designed for about 4096 Hertz. The signal from the directional loop antenna is amplified by a radio frequency amplifier 110. The amplified signal is fed to filters 116, 118, and 120 tuned to each one of the continuous wave transmitters. The T1 filter is tuned to the frequency of transmitter 20A. Likewise the T2 filter is tuned to the frequency of transmitter 20B, and the T3 filter is tuned to the frequency of transmitter 20C. The outputs of each of these filters is fed into signal conditioners 122, 124, and 126 respectively. Functions of these signal conditioners will be described in more detail in FIG. 7. These signal conditioners feed a sequencer 128 which operates to assure that the proper sequence of pulses control counter 130 and a load pulse generator 132. Circuit description of the sequencer are provided in more detail in FIG. 8. The pulses generated by the signal conditioners are also held in a latch 134. The information in the counter and latch are selected by a multiplexer 136 for input into a universal asynchronous receiver transmitter, UART 140. Load control signals for the UART are provided by the load pulse generator and a divide-by-N circuit 138. The serial output of the UART drives a modulator 166 which modulates a transceiver 146. This transceiver then transmits and receives signals from remote transceiver interface 32 of FIG. 1 and FIG. 9. All the transceivers used for data communication in this invention may be of the type used in cordless telephones commonly used in the industry. Thus any of the commercial cordless telephones will suffice. An audio coupler, not shown, may be used to make connection to the microphone input of the cordless handset. An alternate transceiver is the Micro-T transceiver manufactured by Adcon Telemetry of Boca Raton, Florida. A manual control receiver 144 receives signals from hand-held programmer transmitter 22 of FIGS. 10A and B. Selector switch 148 is used to select the programming signal in the program mode, or the automated signal in the automatic mode of operation. A pulse shaper/conditioner 142 conditions the signal for serial input to UART 140. The serial data is converted to parallel data in UART 140 and is provided to a steering latch 150 and a drive latch 152. Data in latch 150 is converted to analog form by a D/A converter 154. The analog signal then feeds into a power driver and comparator 156 which controls steering motor 26. Feedback to comparator 156 is provided by a potentiometer 50 which is mechanically connected to the cross arm as previously described. This feedback provides for proportional control of steering motor 26. Data in latch 152 are buffered by drivers 158A, B, C, and D to relays 160A, B, C, and D respectively. Relays 160A and B connect power to drive motor 162. Relays 160C and D connect power to a speed control motor 164. Motor 164 mechanically turns a rheostat 28 which controls the current through drive motor 162 to control speed of movement.

FIG. 7 shows the functional blocks within signal conditioners 122, 124, and 126 of FIG. 6. These conditioners are analog circuits commonly used in the industry and are available from National Semiconductor Corp., Santa Clara, Calif. They consist of an envelope detector 168, an inverter 170, a differentiator 172, a zero crossing detector 174, and a pulse generator 176. These blocks convert the transmitter signals to pulses. The waveshapes are shown in detail in FIG. 9.

FIG. 8 shows a detailed circuit diagram of a sequencer 128. Operation of this circuit serves to allow only the proper sequence of pulses T1, T2, and T3 to be latched and read. This is required because of the symmetrical nature of the antenna pattern of the directional loop antenna. In certain locations of the cutting area, the order of reception of signals from the continuous wave transmitters may be backwards. The function of sequencer 128 is to allow only a forward sequence to assure the correct clock count and thus the correct angles between the transmitters. The sequencer is composed preferably of CMOS logic, and functions as follows. D flip flops U1, U2, and U3 are initialized to a 1,0,0 state upon power-up. A power-on reset 188 is produced by resistor R and capacitor C. Power-on reset is inverted by inverter U4 producing a momentary logic 1 output from U4. A logic 1 input to one of the inputs of NOR gate U5, U14, and U16 produce a logic 0 input to inverters U6, U15, and U17. The outputs of these inverters are logic 1 which sets flip flop U1 to logic 1, and resets flip flops U2 and U3 to logic 0. The sequencer is now initialized.

In this state only a T1 pulse 250 from signal conditioner 122 of FIG. 6 will change its state. When the T1 pulse comes in, it feeds through NAND gate U7 producing a logic 0 pulse to the input of inverter U8. The output of inverter U8 is a logic 1 pulse which sets flip flop U2 to logic 1, and resets flip flop U1 to logic 0. The output of NAND gate U7, a sequencer signal 196, is fed into an input of NAND gate U13. Since the other inputs to U13 are logic 1, the output of U13, a sequencer output 260, is a logic 1 pulse. Any other input before this point would not produce a sequencer output pulse nor would it change the state of the flip flops.

After the T1 pulse, the state of flip flops U1, U2, and U3 is 0,1,0. The output of flip flop U2 is a logic 1. The state of U1 is logic 0 which prevents the T1 pulse from getting through NAND gate U11. The logic 1 state of flip flop U2 does allow a T2 pulse 252 to get through NAND gate U9 to produce a logic 0 pulse, a sequencer signal 198. Signal 198 is transmitted through NAND gate U13 to produce a logic 1 pulse on sequencer signal 260. Signal 198 is inverted by inverter U10 to produce a logic 1 pulse which sets flip flop U3 to logic 1 and resets flip flop U2 via NOR gate U14 and inverter U15. After the T2 pulse, the state of flip flops U1, U2, and U3 is 0,0,1.

In this state U1 and U2 are logic 0 which prevents the T1 pulse from getting through NAND gate U7. Likewise the T2 pulse is prevented from getting through NAND gate U9. Only a T3 pulse 254 is allowed to get through NAND gate U11 to produce a logic 0 pulse on a sequencer signal 200. Signal 200 is transmitted through NAND gate U13 to produce a logic 1 pulse on sequencer signal 260. Signal 200 is also inverted by inverter U12 to produce a logic 1 pulse which sets flip flop U1 to logic 1 via NOR gate U5 and inverter U6. The logic 1 pulse output of inverter U12 also resets flip flop U3 to 0 via NOR gate U16 and inverter U17. After the T3 pulse, the state of flip flops U1, U2, and U3 is returned back to the original state of 1,0,0.

The process repeats that operation. Whether the input order of pulses is forward, T1, T2, and T3, or in reverse, T3, T2, and T1, the output of the sequencer, signal 260 is always in the forward order, T1, T2 and T3.

Figure 9:
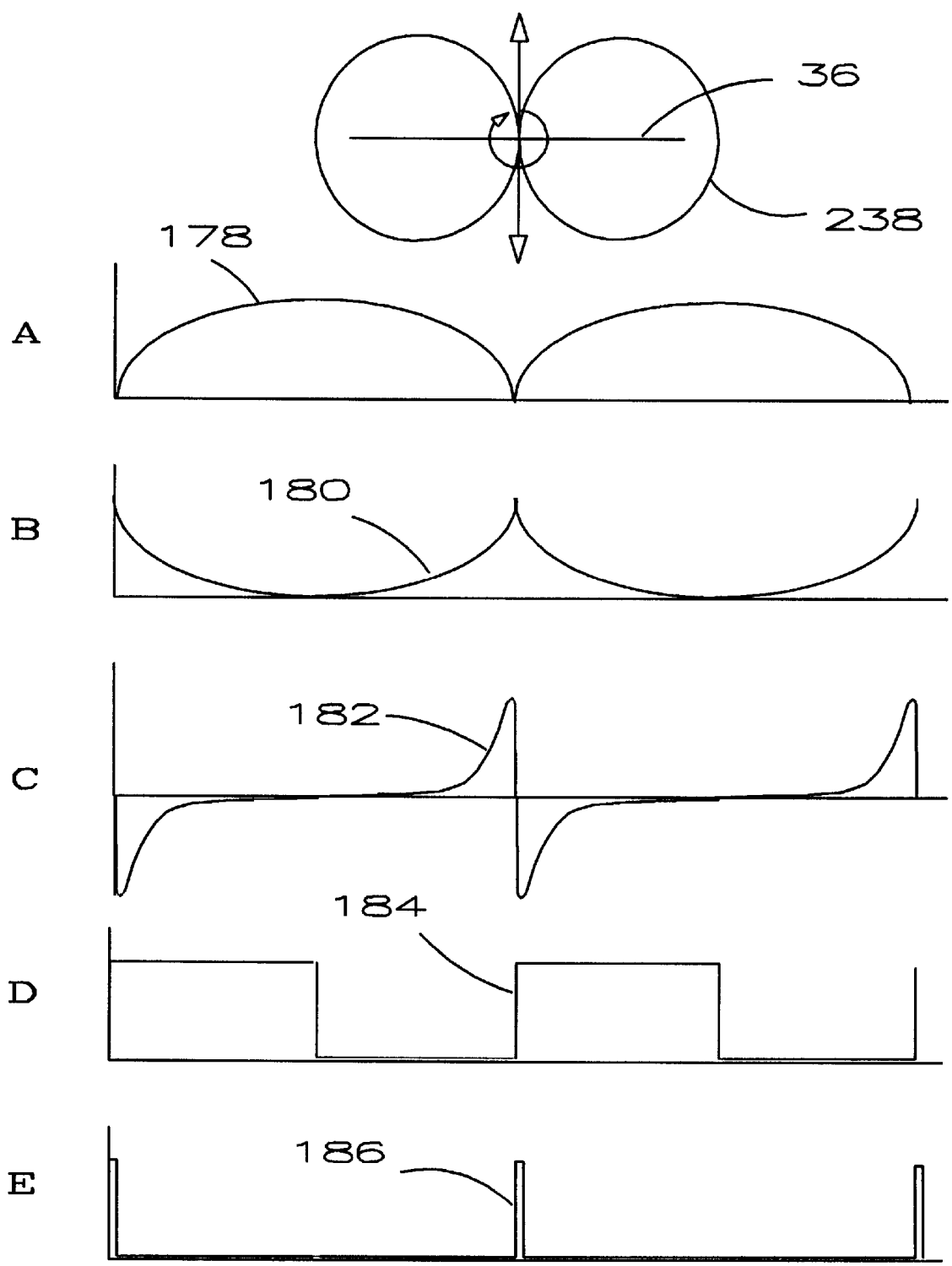
FIG. 9 is a set of charts showing the waveforms of the detected signals from the continuous wave transmitters and pulses generated for input to the sequencer.

FIG. 9 shows an antenna pattern 238 of directional loop antenna 36. FIG. 9 also shows the waveshapes produced by the function blocks of FIG. 7. The output of each of the continuous wave transmitters is a constant, vertically polarized radio frequency source. Each transmitter transmits a unique frequency. The waveforms shown in FIG. 9 are those of the signals from one transmitter. As the loop antenna is rotated, the strength of the signal received from one of the continuous wave transmitters varies. The amplitude goes through two minimums and two maximums for each complete rotation. The signal is minimum when the perpendicular of the plane of the loop antenna points to the transmitter. The signal is maximum when the plane of the loop points to the transmitter. The maximum signal strength is very broad. The minimum signal strength is a sharp point. It is this sharp dip in signal amplitude that is used to mark the angles between transmitters. To achieve this function, a signal 178 is first inverted by inverter 170. A resulting signal 180 is differentiated to give a signal 182. Signal 182 has a fast fall time corresponding to the point of minimum signal strength. The zero cross-over points of signal 182 are converted to digital form in a signal 184 by zero-crossing detector 174. The positive edge of signal 184 is derived from the fast fall transition of signal 182 and is precise. Finally the positive edge of signal 184 is used to trigger pulse generator 176 to produce an identifier pulse 186. Two such pulses are produced per one rotation of the loop antenna and is used to control the counter to measure the angles between each transmitter.

FIGS. 10A & B show two examples of the order of pulses produced by signal conditioners 122, 124, and 126 of FIG. 6. In FIG. 10A the signals received from the continuous wave transmitters are in the order T1, T2, and T3. The relative positions in time of position pulse trains T1 250, T2 252, and T3 254 are also shown. The resultant output of sequencer 128 of FIG. 6 is a sequencer output signal 260 in FIG. 10A. A T1 pulse output on signal 260 of sequencer 128 resets counter 130 of FIG. 6. Counter 130 then counts clock pulses until pulse T2. The count of clock pulses between pulses T1 and T2 represent angle A of FIG. 5A. The count is transferred into UART 140 for transmission to computer 34 in FIG. 6. Pulse T2 then resets the counter which counts clock pulses until pulse T3. The clock count between pulses T2 and T3 represent the angle B of FIG. 5A. That count is transferred into UART 140 for transmission to the computer. Pulse T3 also resets the counter, but the count between T3 and T1 is not used. The entire cycle begins again with pulse T1.

In the case of FIG. 10B the signals received from the continuous wave transmitters are in the reverse order T3, T2, and T1. However as described in detail in FIG. 8, the operation of sequencer 128 allows only the proper forward sequence to go through as they are received. Hence in either case the forward sequence is produced on signal 260 and only valid counts representing valid angles are produced.

FIG. 11 shows remote computer 34 and transceiver interface 32. A transceiver 212 receives data from transceiver 146 of mower 24. The resultant demodulated signal is conditioned by a pulse shaper 214 and fed serially into a UART 216. The parallel output of UART 216 is fed into a receive latch 208 and then into an I/O interface 204. Computer 34 reads that data into memory for processing. Outputs from computer 34 go through I/O interface 204 to a transmit latch 206. The output of latch 206 is fed into the parallel input of UART 216 which converts it to serial form for a modulator 210. Modulator 210 drives transceiver 212 to transmit the control data to transceiver 146 of FIG. 6.

FIG. 12A shows a functional block diagram of hand-held programmer transmitter 22. A steering potentiometer 218 provides a direct current voltage to an A/D converter 220. The output of the A/D is held in a latch 222. Switches 224A through 224D also provide inputs to latch 222. The outputs of the latch are presented to the parallel input of a UART 228. A clock generator 226 controls the baud rate of UART 228. Serial output from UART 228 is modulated by a modulator 230 and drives a transmitter 232. FIG. 12B is a perspective drawing of the transmitter.

FIG. 13 shows an alternate embodiment of this automated lawn mower. It is similar to that shown in FIG. 6 except that an on-board processor, single board computer 234, replaces computer 34 and interface 32 shown in FIG. 9. A number of single board computers exist in the industry such as the SBC1386EX from Micro/Sys of Glendale Calif. This single board computer offers features that are ideal for embedded control applications. It includes flash EPROM and supports various languages. All functions remain the same except that now the data from multiplexer 136 goes directly to single board computer 234. The output of computer 234 goes to a multiplexer 236. Operator inputs are made via keypad and display 64. Switch 148 of FIG. 6 is eliminated as is transceiver 146 and modulator 166. The signal from programmer transmitter 22 is received by receiver 144. The output of receiver 144 goes directly to pulse shaper conditioner 142 and from there to UART 140.

Figures 14B, 14C:
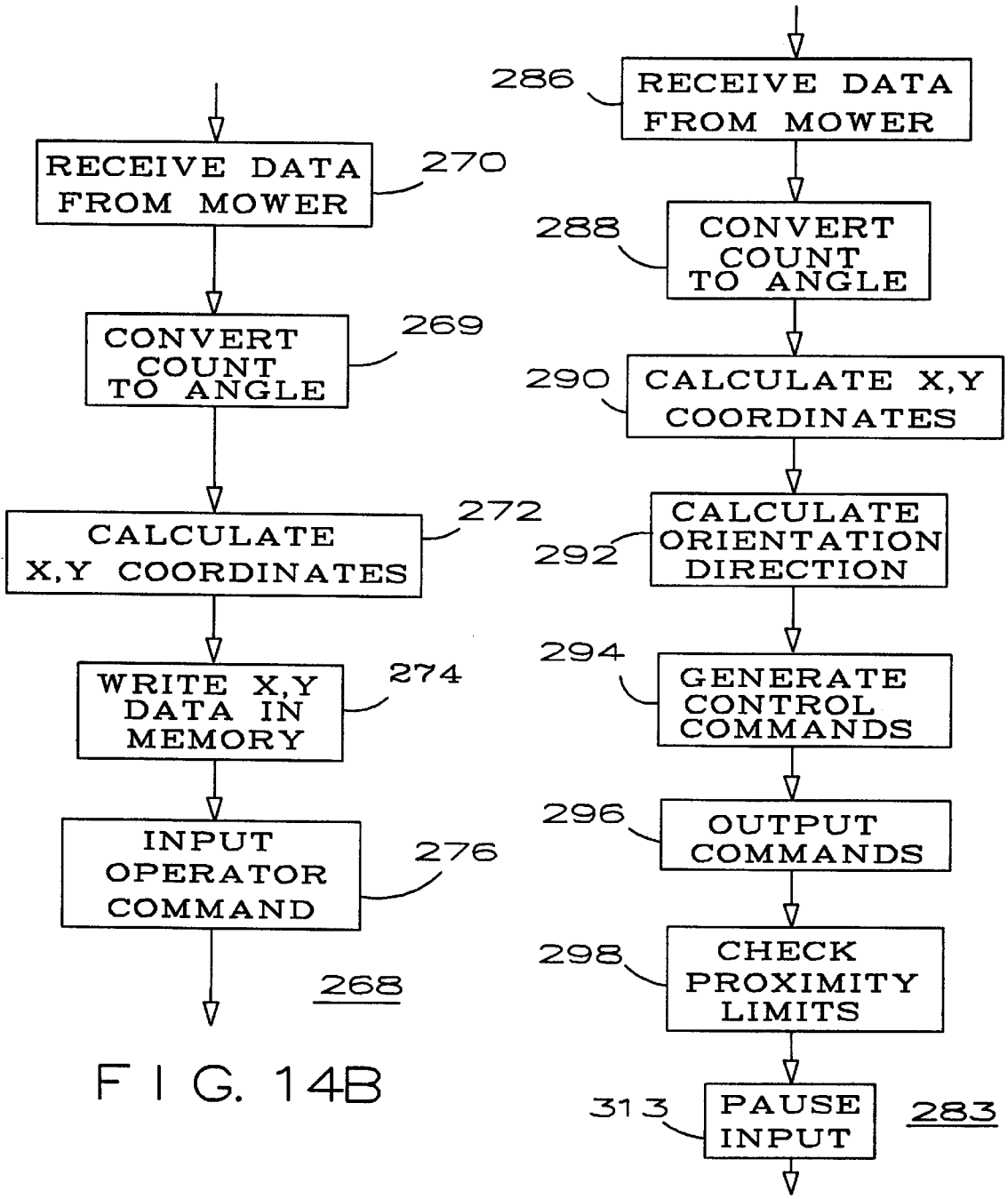

A process flow diagram of the present invention is illustrated in FIGS. 14A, B, and C. Each diamond-shaped box represents a decision point and each rectangular box represents an action. Initialization of parameters takes place at a start point 262. At an input point 264 the computer asks the operator if he/she wants the automatic mode of operation. If the input is "no", a decision point 266 directs process flow to the programming leg of the operation. At a point 267 the computer asks for the distances between transmitters 20A, B, and C. The process proceeds to a command block 268 which is expanded in more detail in FIG. 14B. Process flow continues to a decision point 278. If there is no operator input then flow returns by a path 318 to the top of command block 268, otherwise it goes to a point 300 to identify the path for future use. Flow then stops at the end of the process at a point 320. If the selected mode of operation was automatic, then decision 266 directs flow to the automatic leg of operation. At an input point 280 the computer asks for a selection of path. At a read point 282 the computer reads the selected file containing the path information. A read point 284 reads the first stored data point. Process flow then proceeds to a command block 283. Details of this block are shown in FIG. 14C. A limits decision point 302 in FIG. 14A decides whether or not it is close enough to the next data path coordinate. If it is not, flow control goes back via a path 314 to the top of command block 283. If it is within limits, the next stored path point is fetched at a read point 304. To keep a record of where it is in the stored path, a point count variable is incremented at a point 306. Therefore if the operator interrupts the operation at any point in the path, he can resume it again without starting over at the beginning. The process flow continues to a decision point 308. If it is not at the end of the path, flow goes to a pause decision point 310. If the operator inputs a pause, then the computer displays the point number at a display point 312 and checks operator input again at a point 313. Flow loops back to the input of decision point 310 until the operator releases the pause. At that point, flow control goes back once more via a path 316 to the input of command block 283 and the process repeats. If the computer detects the end of data at decision point 308, then the path is complete and the process stops at a point 320.

In FIG. 14B, a receive data point 270 receives count data from the mower. The count is converted to angle in degrees at a convert point 269. The computer can then calculate the coordinates at a calculation point 272. This data is written to memory at a store to memory point 274. At an input point 276 the computer checks for any operator input to stop the operation.

Referring to FIG. 14C the first action is to receive data from the mower at a point 286. The clock count is converted to angle data at a point 288. From the angle data and the dimensions inputted by the operator, the parameters of the circle equations are calculated and then the x-y coordinates of the mower are calculated at a point 290. At a point 292, the computer calculates orientation from present and previous coordinates. The computer now knows where it is and where it needs to go. It generates the control commands at a point 294. The computer determines speed control from closeness of stored points and motion control from a reversal of stored points. It outputs those commands at an output point 296. The computer checks proximity limits at a point 298. The operator may input a pause at a point 313.

FIG. 15 shows a sketch of an orientation vector 322 and a steering vector 324 used to determine a steering control angle S' 326. From previous point P1 and present point P2, the computer determines the orientation vector. When the mower is within the proximity limits for point P2, the computer reads the next data point P3 from memory. It then calculates steering vector 324. From the difference in the angles of vectors 322 and 324, the computer calculates the value of the steering angle S'. The computer then transmits a command to the mower to steer it in the direction of that point.

FIG. 16 shows an aerial view of an example path 330 that the mower may be programmed to follow. Path 330 depicts the path following a series of x-y coordinate points previously stored in the memory of the computer. An area to be cut 328 is shown as rectangular but could be any irregular shape within a rectangle formed by the transmitters. The only requirement is that the maximum dimensions of area 328 should be less than the distances between transmitters 20A, 20B, and 20C which form a right angle over the area. Mower 24 can be started at any point in the area to be cut, during its initial programming phase. The entire lawn can be cut by remotely steering the mower around the lawn in any desired fashion. There is no limit of how many times the mower can be made to go around in circles and no restriction to crossing over any previous parts of the path. At the end of the programming phase, and the next time the lawn requires cutting, the mower can be started near the same starting point which can be its normal place of storage, garage or shed, and it will follow the same path as originally programmed.

OPERATION—FIGS. 1, 16

Programming Phase

To start the programming phase of operation, the operator places the continuous wave transmitters 20A, B, and C in a right angle formation somewhat outside the area to be cut. To facilitate placement of the transmitters in the future, short pipes of about one-half inch in diameter may be pushed into the ground and permanently left there if possible. The transmitters may be fitted with a short projection, not shown, to stick into the hole of the pipe. Since they are battery powered, the power is switched on at each transmitter. Power is turned on at computer 34, hand-held programmer/transmitter 22, mower 24, and the mower engine is started. The computer asks for the mode of operation and also the distances between the transmitters. The operator inputs these data. The operator then uses the hand-held programmer/transmitter to control and steer the mower in any desired path. As the operator manually directs the mower, the directional loop antenna and associated system measures the angles between the continuous wave transmitters. The raw data is transmitted to computer 34. The computer processes the data and stores it into memory as x-y coordinate data. If the operator changes the speed of the mower, the distance between data points changes also. Faster speed produces farther spaced data points. If the operator stops and reverses direction, there is a reversal of data points. This reversal will be recognized by the computer in the automatic mode of operation to control the forward and reverse movements. The operator must keep the mower within cutting area 328. When the job is finished, the operator stops the mower and enters an input to the computer to identify the path for future automatic use. The computer then stores the path data into permanent storage. The programming phase is now complete. The operator shuts the mower off and turns off power to all units of the system.

Automatic Phase

To run the mower automatically, the operator places the continuous wave transmitters in their respective positions. He turns on power to all units as he did in the programming phase described above. The computer requests inputs from the operator for mode of operation. In the automatic phase, the computer asks the operator for path identification. It reads the appropriate identified file for the path data and commences to mow the lawn in accordance with that data. If for any reason the operator needs to pause the operation, he stops the mower movement and inputs the command to the computer. The computer will display and also remember where it is in the path and will resume where it left off if so instructed. If the operator turns power off and back on later, he can input the point at which the mower stopped and let the computer continue where it paused. As the mower proceeds to each successive point the directional loop antenna and associated system measures the angles between the continuous wave transmitters. The stored path data points are retrieved from memory by the computer. The computer calculates its position and orientation. From this information it generates the control commands for steering the mower to the next point. It generates the control command for speed from the distance between each stored path data. The farther away each point is from the next point, the faster the mower will move. If the points abruptly reverse direction, the computer generates the reverse direction command. Thus the computer determines the entire movement of the mower throughout the data path. When the end of path is reached, the mower stops automatically.

SUMMARY, RAMIFICATIONS, AND SCOPE OF INVENTION

Thus the reader will see that the automated lawn mower in this invention is easy to use, versatile, and flexible to program. It may also be amusing to watch this mower do all the hard work while relaxing in the shade with a cool drink on a hot day. Furthermore, the automated lawn mower has the additional advantages in that the use of the directional loop antenna, continuous wave transmitters and solution of simultaneous circle equations to determine the x-y coordinate position solves the inadequacies of prior art problems.

it provides accurate position information without buried conductors.

it eliminates the need for markers for recalibration.

it obviates the use of above-ground wires or lights for guidance.

it increases the reliability over cut-uncut grass border detection.

it is flexible to make changes and to store a wide variety of different paths.

it does not require initial manual border cuts to be made before starting an automatic operation.

While the above description contains many specificities, these should not be construed as limitations on the scope of the invention, but rather as an exemplification of one preferred embodiment thereof Many variations are possible. For example the remote personal computer may be used not only to perform coordinate calculations and control functions, but also to plot the position and status of the mower. This information could be seen at the remote location, for example inside a building. Another embodiment of this invention is to have a single board computer installed right on the mower itself. This variation would eliminate the personal computer, its interface and the associated transceivers on the mower and at the remote site. Another example is that a vehicle could be used to mount a remote video camera to patrol the inside or outside of a building such as a warehouse for security and transmit the images to a remote monitor. Another example is that a vehicle could be used to perform other lawn and garden functions such as scattering fertilizers. The transmitters and remote control devices might utilize sound waves or infrared light beams instead of radio waves whereby desired controls can be achieved through the best possible way in different situations. Although the description of the directional loop antenna details a circular form, it is not limited to a circular shape. It may be square, triangular, or any other polygon shape. The material of the form for the coil may be any number of types, plastic, glass, or any non-magnetic material. The apparatus used to rotate the loop antenna may be any number of mechanisms. For example a basic audio cassette recorder deck would work. The only requirement is that the rotational speed be constant for accurately measuring the angles between transmitters.

The sequencer maybe enhanced with circuitry to assure that noise doesn't inadvertently change the states of flip flops so that erroneous operation doesn't occur. Alternatively the function of the sequencer might be handled within the computer itself.

The number of continuous wave transmitters might be increased to provide greater position accuracy if needed in extreme situations. A clock frequency of 4096 Hertz at the counter input will provide a worst case resolution of approximately 0.85 centimeters (⅓ inch) with a distance of 30.5 meters (100 feet) between continuous wave transmitters. For larger areas this frequency may be increased to maintain high resolution and accuracy of position determination.

The direct current drive motor may be replaced with a clutch and gear mechanism to turn the drive wheels directly from the engine. An actuator would then select forward or reverse gears. The steering motor and worm gear apparatus can utilize those parts of power windows commonly used in automobiles.

Of the two data antennas, one of them may be eliminated by using only one antenna to communicate with the programmer transmitter and the computer simultaneously. This is possible because transceivers can operate in full duplex mode on different frequencies. Therefore it can receive from the programmer transmitter while transmitting data to the computer.

A further safety feature can be added by amending the routine in the computer to sense a hardware malfunction causing it to stop the mower. Another safety feature can be added in the hardware electronics to sense a loss of signal from the computer or other transmitters thereby shutting down the mower. Accordingly, the scope of the invention should be determined not by the embodiments illustrated, but by the appended claims and their legal equivalents.

I claim:

1. A method for controlling the operation of an automated vehicle in accordance with stored coordinate information compared with calculated coordinate position determined from the solution of simultaneous circle equations, said method including:

measuring the angles between continuous wave radio frequency transmitters placed in a right angle configuration around an area to be cut, calculating a coordinate position of said automated vehicle from said solution of simultaneous circle equations defined by said angles and dimensions between said continuous wave transmitters, generating control signals to steer said automated vehicle in the direction of the next point of said stored coordinate information.

2. The method of claim 1 wherein a programming phase operates to store calculated coordinate data as said vehicle is manually directed through a desired cutting path.

3. The method of claim 1 wherein a safety means operates to cause termination of operation of said vehicle in response to said safety means contacting an unexpected object.

4. A guidance system to control a self propelled lawn mower and operative to determine its location in accordance with a simultaneous solution of a set of circle equations defined by angles between continuous wave radio frequency transmitters in a known geometrical configuration, including a directional sensing means to detect a line of sight of each of said continuous wave radio frequency transmitters.

5. The guidance system of claim 4 further including a means to identify each of said continuous wave radio frequency transmitters.

6. The guidance system of claim 4 further including a signal conditioning means to generate digital pulses from said line of sights by said directional sensing means.

7. The guidance system of claim 4 further including a sequencing means to order said digital pulses to assure correct measurement of said angles between said continuous wave radio frequency transmitters.

8. The guidance system of claim 4 further including a counting means to count clock pulses, the number of which represents said angle between said lines of sights of each of said continuous wave radio frequency transmitters.

9. The guidance system of claim 4 further including a central processing means to define a set of circle equations from said angles between said lines of sights of said continuous wave radio frequency transmitters and from known distances between said continuous wave radio frequency transmitters.

10. The guidance system of claim 4 wherein said central processing means calculates a set of position coordinates from said simultaneous solution of said set of circle equations.

* * * * *